United States Patent
Kashulines, Jr. et al.

(10) Patent No.: US 6,270,826 B1
(45) Date of Patent: Aug. 7, 2001

(54) METHOD FOR FORMING CONFECTIONERY PRODUCT

(75) Inventors: Peter Thomas Kashulines, Jr., Mountain Lakes, NJ (US); Emil Anthony Kritzer, Shipman, VA (US); Robert Otto Brandt, Jr., Wilmington, NC (US); Aubrey Elmo Jones, Jr., Sparta, NJ (US); Malcolm Albert Austin, Warsaw (PL); Ray Louis Peterson, Chattanooga, TN (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/459,474

(22) Filed: Dec. 13, 1999

(51) Int. Cl.[7] .................. A23P 1/00; A23G 1/00
(52) U.S. Cl. .............. 426/512; 426/285; 426/660
(58) Field of Search ................. 426/512, 285, 426/660; 425/237, 294

(56) References Cited

U.S. PATENT DOCUMENTS

| | | | |
|---|---|---|---|
| 3,255,285 | 6/1966 | Chilaon | 264/109 |
| 4,017,241 | 4/1977 | Papinchak et al. | 425/237 |
| 4,178,392 | 12/1979 | Gobble et al. | 426/96 |
| 4,394,395 | 7/1983 | Rostango et al. | 426/285 |
| 4,411,611 | 10/1983 | Ohtawa et al. | 425/237 |
| 4,882,105 | 11/1989 | Volk, Jr. | 264/40.1 |
| 4,886,441 | 12/1989 | Lortz | 425/236 |
| 4,999,206 | * 3/1991 | Lortz | 426/512 |
| 5,073,323 | 12/1991 | McCartney | 264/118 |
| 5,358,727 | 10/1994 | Yates et al. | 426/512 |
| 5,382,148 | 1/1995 | Yates et al. | 425/237 |
| 5,439,695 | 8/1995 | Mackey | 426/516 |
| 5,667,824 | 9/1997 | Ream et al. | 426/5 |
| 5,902,621 | 5/1999 | Beckett et al. | 426/279 |

FOREIGN PATENT DOCUMENTS

| | | |
|---|---|---|
| 649444 | 5/1985 | (CH) . |
| 0703827 | 9/1996 | (EP) . |
| 0776608 | 10/1996 | (EP) . |
| 0855141 | 7/1998 | (EP) . |
| 0923875 | 6/1999 | (EP) . |
| 641682 | 8/1950 | (GB) . |
| 1527240 | 10/1978 | (GB) . |
| 98 38871 | 9/1998 | (WO) . |

OTHER PUBLICATIONS

Beckett et al., The Cold Extrusion of Chocolate, Transcript of the Institution of Chemical Engineers, vol. 72, Part C (Mar. 1994) pp. 47–54.

* cited by examiner

Primary Examiner—George C. Yeung
(74) Attorney, Agent, or Firm—Fitzpatrick, Cella, Harper & Scinto

(57) ABSTRACT

A method and apparatus for making a shaped confectionery product of Bingham plastic rheology by cold extrusion wherein particles of the confectionery product are fed between counter-rotating form rolls having depressions corresponding to the desired product shape. The particles are compacted and compressed between the form rolls and fuse together to exit with a thin web of material interconnecting the shaped confectionery product. The release of the product from the roll surface is aided by induced differential motion between the rolls.

17 Claims, 4 Drawing Sheets

METHOD FOR FORMING CONFECTIONERY PRODUCT

BACKGROUND OF THE INVENTION

Field of the Invention

The present invention relates to a process and apparatus to make shaped confectionery products from a chocolate or other material which approximates a behavior similar to a Bingham material. More particularly the present invention relates to the formation of such shaped confectionery product by a cold extrusion process.

Confectionery products such as chocolate products are typically made from a molten mass of chocolate after the chocolate has been formulated. There are many different chocolate formulations such as dark and light chocolate, milk chocolate and white compound coatings which typically include sugars or sugar substitutes, dry milk powders, emulsifiers, and a fat such as cocoa butter or vegetable or other fat substitutes.

Traditional chocolate processing to make shaped chocolate products, i.e., bars or other shapes, and enrobed products are carried out while the chocolate is in a molten or flowable state. Following a melt conditioning process, known as tempering, usually at a temperature of between 27°–32° C., the chocolate is molded into a desired shape by molds or formed into a desired shape by other molding processes while the chocolate is still in a molten state at an elevated temperature above ambient temperature.

Recently there has been reported work on the formulation of chocolate products by a cold extrusion process, e.g., Becket et al., The Cold Extrusion of Chocolate, Transcript of the Institution of Chemical Engineers, Vol. 72, Part C, March 1994, pp. 47–54, U.S. Pat. No. 5,439,695 and European Patent Application EP 0 730 827, published Sep. 11, 1996. The processes and apparatus disclosed in these publications do not teach or suggest use of a cold extrusion process to make chocolate products having a distinct shape such as a lentil shape, star shape or a shaped figure to represent seasonal holidays such as Easter, Halloween, Christmas or any other shaped figure. The extrusion processes and apparatus disclosed in these prior publications utilize molding techniques and apparatus which by their nature preclude the formation of precisely shaped chocolate products.

European patent EP-0-776-608 discloses a process for molding chocolate products in a non melted state. This process involves subjecting crystallized chocolate to die extrusion to form a malleable sheet. This sheet is then fed directly into forming rolls. This patent does not disclose or suggest a process involving forming a particulate feedstock or the unique products formed by shape particulate Bingham plastics. The patent also does not disclose or suggest a process for generating release of the formed sheet from the rolls by controlled differential motion between the rolls.

Devices for roll compacting or sintering shaped articles by passing granular material between counter-rotating rolls having spaced depressions in the rolls have been utilized heretofore for many types of products. Merely illustrative of some of these prior art devices are U.S. Pat. No. 5,358,727 which discloses counter-rotating rolls with mold cavities to form food products from fruit such as pitted prunes or berries; U.S. Pat. No. 4,411,611 discloses counter rotating rolls to form briquettes from pulverized and/or granular material; U.S. Pat. No. 5,073,323 which discloses an apparatus for compacting non-extrudable ceramic tumbling media between counter-rotating form rolls; U.S. Pat. No. 4,017,241 which discloses a briquetting apparatus for forming briquettes of metallic ore; and U.S. Pat. No. 3,255,285 which discloses counter-rotating ridged rolls to compact granular fertilizers and animal feed.

Additional prior art to compact and form briquettes using various types of presses to compact the material are shown in U.S. Pat. Nos. 5,667,824, 4,882,105, 4,394,395 and 4,178,392.

None of these prior art devices and processes suggest use of counter-rotating rolls to compact a material having a Bingham plastic rheology and none of these prior art devices disclose or suggest using a differential movement between the counter-rotating rolls to assist in release of the sheet of formed pieces and interconnecting web from the rolls.

Currently in the manufacture of a shaped chocolate product, for example, a lentil shape which is subsequently provided with a sugar coated shell, the chocolate mass in molten form is provided to relatively large diameter counter-rotating rolls which have an appropriate lentil shaped depression in the face of each roll. Side panels are provided to keep the molten chocolate confined to the area between the rolls and the molten chocolate sits in a puddle above the rolls. As the rolls turn the molten chocolate is drawn into the nip between the rolls and shaped to the appropriate lentil shape by the mating indentations in each roll.

The rolls are chilled by flowing a cooled liquid such as 50/50 by volume an ethylene glycol and water solution at approximately −20° C. through the rolls beneath the chocolate contact surface to draw heat from the molten chocolate to allow it to be formed to shape with a sufficient degree of rigidity to retain the imparted shape. The formed chocolate exiting from the rolls is what may be termed in a semi-solid state requiring additional cooling to bring the chocolate to room temperature where it can be readily processed to remove the flashing between each lentil and then subsequently sugar coated, or for baking chocolate pieces just deflashed and packaged. This process also requires dehumidification near the form rolls to withdraw moist air.

The additional cooling step after passage from the formation rolls requires the use of cooling tunnels, conveyors and additional refrigeration to provide a proper cooling temperature within the cooling tunnels.

Because the process begins with chocolate in a molten state which must flow into the shaped depressions, of necessity, larger sized shapes must be employed and, smaller shapes, or shapes having irregular variations such as star shapes or shaped figures are difficult to provide with this traditional method and apparatus because of the flow properties of molten chocolate when it contacts a chilled surface.

In addition, the diameter of the rolls must be relatively large and the rolls turn at a relatively slow speed to insure that the molten plastic is drawn from the puddle of chocolate between the roll nips to fill all of the formed space in the opposed rolls.

These current processes require relatively large equipment size, use of refrigerated fluids such as an ethylene glycol solution to chill the formation rolls, dehumidification and use of cooling tunnels with added refrigeration which all add to the manufacturing cost and complexity.

Accordingly, there has been a need in the confectionery field to provide a process and apparatus to more economically form shaped confectionery products, such as chocolate, and increase throughput by the ability to operate formation equipment at higher throughput rates at less cost due to the elimination of the use of super cooled coolants and refrigeration equipment in cooling tunnels.

SUMMARY OF THE INVENTION

In a preferred embodiment of the present invention applicable to the forming of shaped confectionery products, a preferred confectionery product being chocolate, a pair of opposed rolls are provided having the desired shape for the formed chocolate product as a depression on the surface of each roll. The rolls are mounted for counter rotation with no or a slight space between the rolls and a hopper is provided above the counter-rotating rolls to direct, by a gravity feed, highly crystalline tempered chocolate in the form of flakes, shavings or granules to the rolls. Because the Bingham plastic material used in this process is mostly crystallized and cooled before forming, it allows for the use of more efficient cooling and crystallization methods to arrive at the desired final product morphology, temperature and crystallization state. There are many cooling and/or crystallization processes involving mechanical agitation and manipulation of Bingham plastics which can be used on the feed stream of the process of the present invention to arrive at the desired morphology, temperature and crystallization state. These more efficient processes often cannot be used for hot formed products because they are crystallized and cooled after forming which would result in mechanical damage to the desired final piece shape.

The counter-rotating rolls draw the chocolate pieces down between the nip of the rolls to compress and compact the chocolate pieces in a process akin to sintering to form the chocolate into the desired shape. The chocolate leaves the rolls in a downward direction in sheet form with the formed chocolate pieces interconnected by a thin web of chocolate. The bulk temperature of the chocolate is not changed. A small portion of the chocolate, specifically that in what is called the Beta 3 form and below melts. However, this melting is not significant and no additional cooling in cooling tunnels is necessary.

The sheet is then deflashed and the chocolate pieces agitated in a conventional manner to smooth the edge where the web interconnected the formed pieces. The chocolate pieces may then be further processed, if desired, by coating with a sugar shell or packaged without coating for ultimate consumer use.

DESCRIPTION OF A PREFERRED EMBODIMENT

Figure 1:
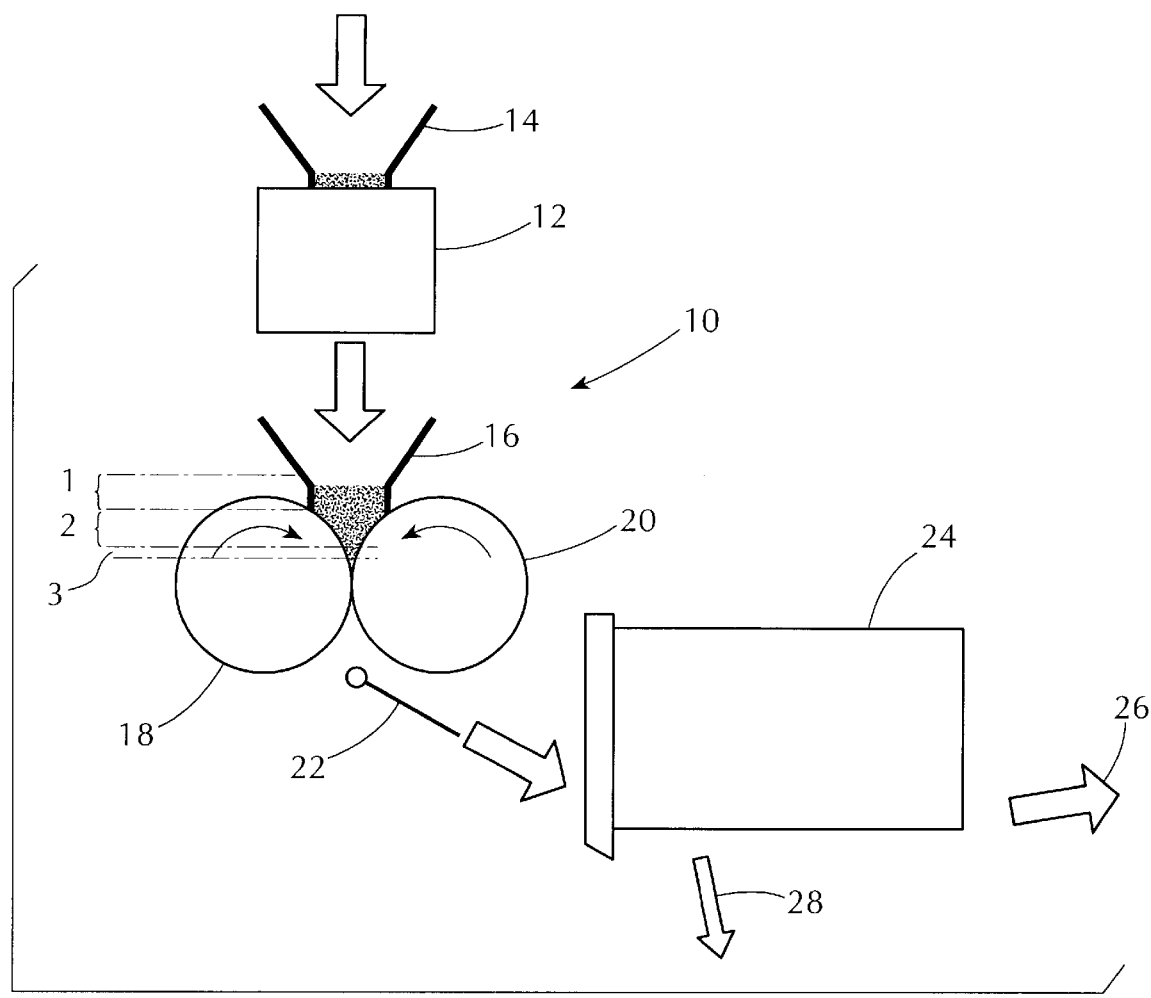
FIG. 1 is a schematic representation of the overall process and apparatus of the present invention.

With reference initially to FIG. 1, the apparatus 10 of the present invention includes a storage bin 12 having a hopper 14 into which flaked, shaved or granulated chocolate of granule size less than 6 mm diameter is fed. From bin 12 the chocolate pieces are fed, as needed, to a feed hopper 16 from which it is deposited between the nip of a pair of counter-rotating form rolls 18 and 20. Form rolls 18 and 20 rotate toward each other in the direction indicated by the arrows. Form rolls 18 and 20 are provided, as will be explained below, with shaped depressions, which mate as the form rolls rotate, to compress and compact the chocolate particles to form the desired shape.

Due to the gravity feed nature of the process, it has been found that the particle diameter of the feed material should be <½ the diameter of the mold pocket. Smaller feed particles have no detrimental effect while large particles will often yield insufficient filled pockets yielding incomplete pieces. The chocolate composition used in the preferred embodiment was USA standard identity chocolate containing approximately 30% fat by weight and had a microscopic particle size of approximately 40 microns.

The preferred temperature range of the freshly crystallized (2–10 minutes old) feed chocolate was 12–16° C. with the majority of the fat in the type V stable crystalline form. If the freshly crystallized feed chocolate is allowed to age for several hours to days, the crystallinity level gradually increases to its thermodynamic equilibrium level. The preferred feed temperature of this aged crystallized chocolate then shifts upwardly to 17–21° C. This preferred high fat crystallinity level of the feed chocolate is characterized by hardness to the touch. The feed chocolate is hard enough to exhibit a distinctive snap sound when a 5 cm long melt chunk is slowly broken in half by hand.

The throughput exiting from the rolls is in the form of a continuous sheet. The sheet is composed of the compacted and cohesive shaped forms called pieces as well as a flat webbing between the pieces called the web.

The exiting formed sheet may be directed by a diverter gate 22 to a rotating deflash drum 24 which rotates to separate the formed chocolate pieces from the thin interconnecting web. From the deflash drum the formed pieces are directed, as indicated by arrow 26, for further processing and the disconnected webs of chocolate are directed, as indicated by arrow 28, to another location where it can be reused as a feed material in the process.

Figure 2:
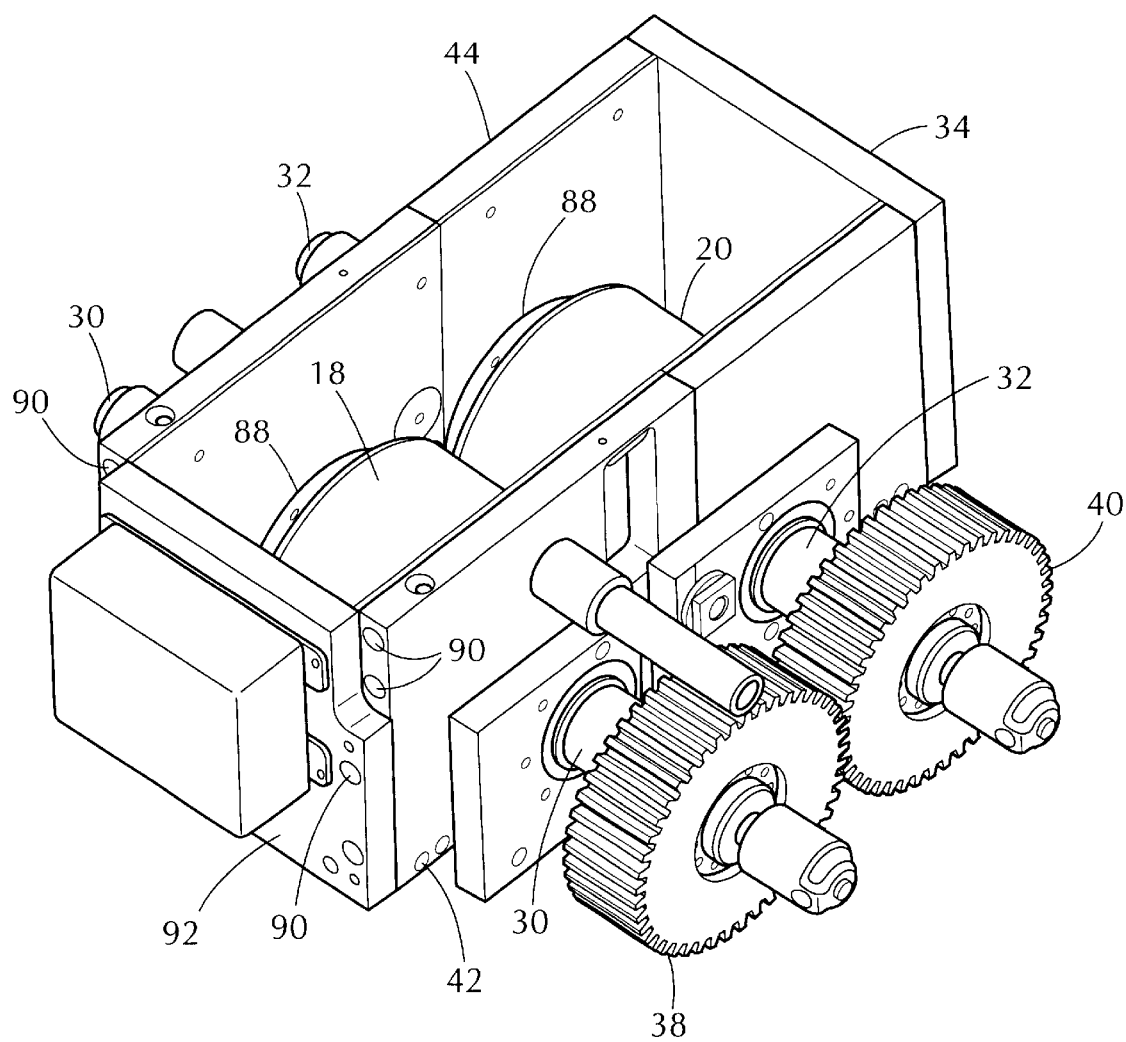
FIG. 2 is a partial perspective view showing the essential features of the apparatus of the present invention.
Figure 3:
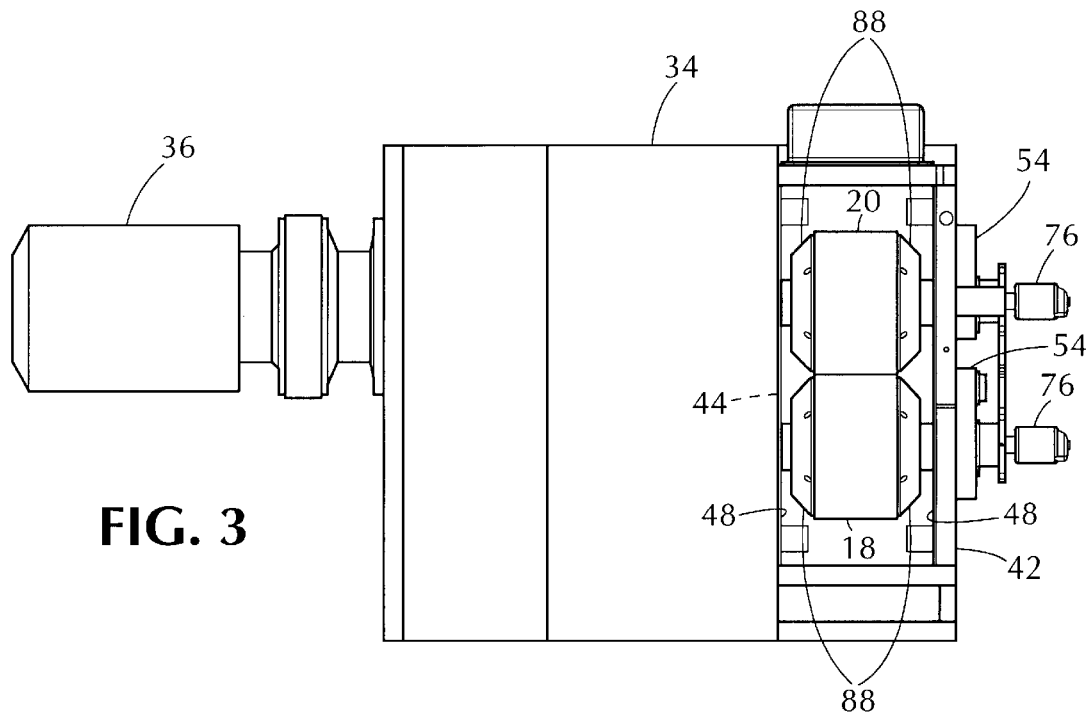
FIG. 3 is a top plan view of the apparatus of the present invention.
Figure 4:
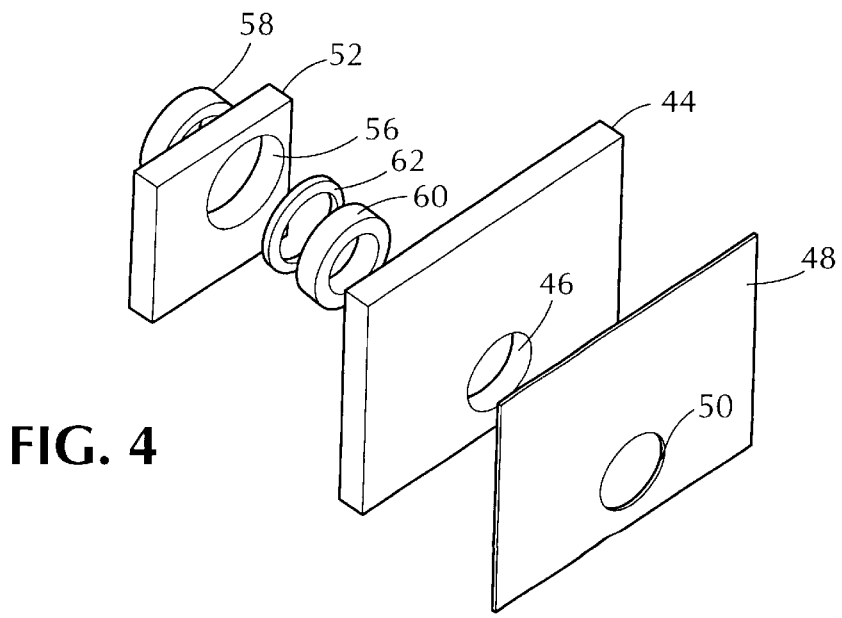
FIG. 4 is an exploded perspective schematic of a shaft bearing mount.

With reference now to FIGS. 2 to 4, the form rolls 18 and 20, are respectively mounted on shafts 30 and 32 within a housing 34. A variable speed drive motor 36 rotatably drives one shaft 32. Each shaft is provided with a spur gear 38 and 40, respectively, which mesh so that when the driven shaft rotates it drives the other shaft in a counter-rotation. It will be appreciated by those of ordinary skill in the art that other mechanical drive systems could be employed including other gearing arrangements or drive transmission systems. The important factor is that a drive system of sufficient power is present to drive the shafts on which the form rolls 18 and 20 are mounted so that the form rolls rotate toward each other. Another important consideration is the ability to vary the speed of rotation. This can be done with a variable speed drive motor 36 or appropriate gear transmission systems for speed adjustments.

Each shaft 30 and 32 extends through a front wall 42 and a rear wall 44 of housing 34 and are mounted therein by a bearing arrangement which accommodates slight shaft flexure as will be described more fully below. The bearing arrangement for each shaft is shown schematically in FIG. 4 where the left side represents the outer bearing and the right side the inner bearing mount. Each shaft 30 and 32 is similarly mounted for rotation by a pair of bearing mounts.

As seen in FIG. 4, rear housing wall 44 includes a shaft access bore and a liner plate 48 with a shaft access bore 50.

Liner plate 48 is on one side of the form rolls 18 and 20 and a similar liner plate 48 is provided on the other side of form rolls 18 and 20 within housing 34. Each bearing mount also includes a bearing mount plate 52 outside rear wall 44 and a bearing mount plate 54 outside front wall 42. Each plate 52 and 54 includes an access bore 56 within which the bearings mounting shafts 30 and 32 are disposed.

Each shaft is provided with a pair of bearings at each bearing mount with the outer bearing member 58 preferably being a cylindrical roller bearing to provide additional support for shafts 30 and 32 and the innermost bearing 60 being tapered thrust bearings which assist in shaft flexure between the bearings. Bearings 58 and 60 are separated by a bearing spacer 62. The bearings 58 and 60 with spacer 62 are press fit into a respective bearing mount plate 52 and 54.

Figure 5:
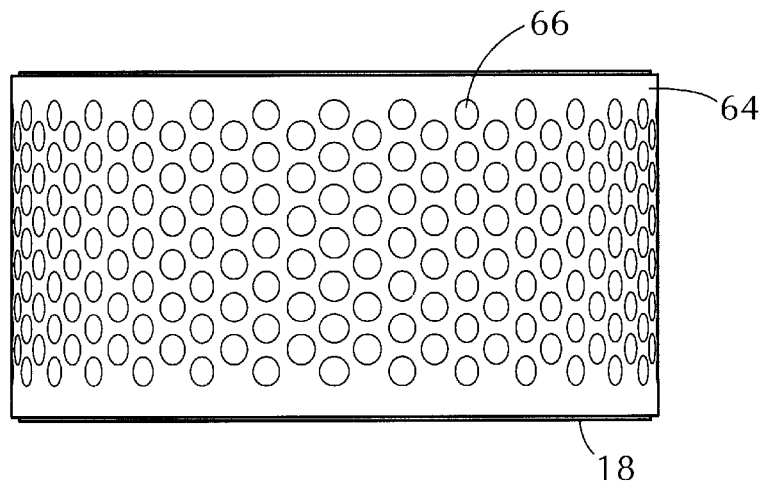
FIG. 5 is a plan view of a form roll illustrating one embodiment of shaped depression to form a shaped product.
Figure 6:
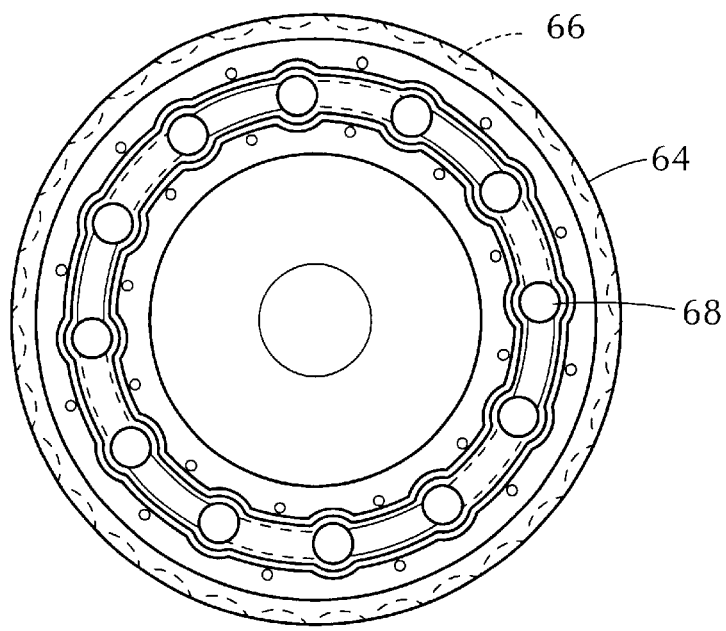
FIG. 6 is a side view of a form roll of the present invention.
Figure 7:
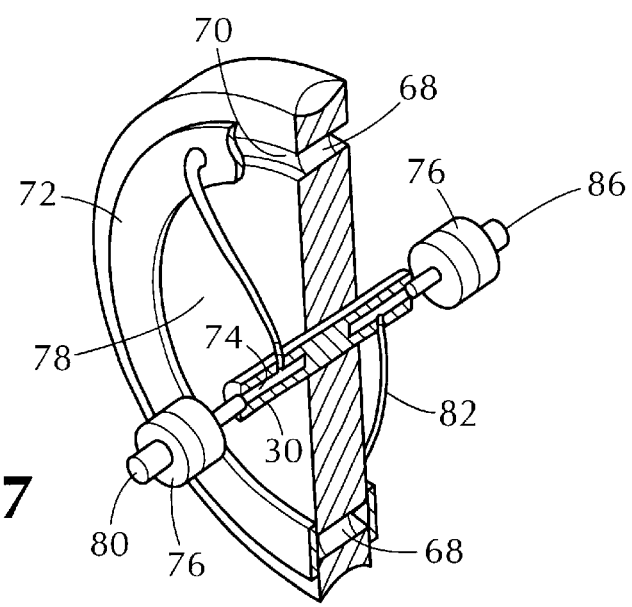
FIG. 7 is a partial perspective view of a form roll of the present invention.

Reference is now made to FIGS. 5–7 for details of form rolls 18 and 20, with each roll being the same. As shown in FIGS. 5 and 6, each form roll includes a peripheral ring member 64, preferably made from anodized aluminum with a Teflon coating to facilitate removal of the compressed formed sheet of chocolate. Preferably the surface is a highly polished or smooth finish to form shaped pieces with no surface discontinuities. A plurality of depressions 66 are provided in the surface of ring member 64. The spacing between depressions 66 on ring member 64 is dependent upon the size and diameter of the depressions. It has been found that the mold cavities, when arranged in a staggered fashion, should be separated a minimum from each other on all sides by the distance equal to approximately ¼ the major diameter of the mold cavities. Closer spacing has been found to yield split pieces due to interference from the backflow of material during forming of neighboring pieces. Other factors to be considered are the release angle of the formed sheet as it passes through the nip and the depth of the formed piece. The most desired behavior is full release without hang up on the forming rolls.

Depressions 66 may be of any desired shape to achieve the desired shaped confectionery product. In a preferred embodiment the depressions 66 are shaped to make a lentil shape for subsequent sugar shell coating to make a product such as M&M's® candy. It has been found that other desired shapes such as character figures, stars, hearts, eggs and other shapes may be employed as well. However, because of the nature of chocolate it has been found that shapes with a rounded peripheral extent are best to provide a good release angle to allow the formed sheet to readily disengage from the form rolls. The depression on each roll need not be identical as a character figure can be made with a back side and a front side which is different. The important consideration is that each impression as it mates in the nip align so that a piece is formed having similar radial dimensions.

When the confectionery product being processed is chocolate, the chocolate flakes or granules at the start of the process are at ambient temperature. However, when it is compacted, the pressure exerted by the compressive force as the chocolate passes through the nips of the form rolls causes the surface of the chocolate in contact with the form rolls to rise and would result in the chocolate adhering to the surface of the form rolls so as to retard the release of the formed sheet from the form rolls. Accordingly, it is desirable to provide coolant to maintain the surface of the form rolls within a preferred temperature range of 14° to 20° C.

Thus, each form roll 18 and 20 is provided with a coolant circulation pathway to allow a coolant, such as cooled water, to circulate near the surface of the form roll. As best seen in FIGS. 6 and 7, each form roll 18 and 20 is provided with a plurality of through bores 68 through the form roll disposed in an annular undercut groove 70 on each side of a form roll 18 and 20. An annular groove sealer plate 72 is sealingly engaged over each undercut groove 70.

Each shaft 30 and 32 is provided with a partial central bore 74 through which the coolant can flow. A coolant coupling 76 is provided at each shaft end which rotates with its respective shaft. A coolant distribution line 78 is provided which communicates with central bore 74 and with undercut groove 70 through groove sealer plate 72. Thus coolant flows through an inlet 80, through central bore 74 and distribution line 78 into undercut groove 70 through form roll 18 and 20 and out coolant outlet line 82 into a central bore 84 in the shaft to exit through fluid coupler 76 at an exit 86. Each form roll 18 and 20 is also provided, see FIG. 2, with end covers 88 to cover the coolant distribution system.

A preferred material for the frame and rolls of apparatus 10 is 6061T6 Aluminum for its high thermal conductivity, light weight, and desired mechanical properties. The shafts 30 and 32 are preferably 316 stainless steel for its corrosion resistance and mechanical rigidity.

To provide further consistency for the temperature dependent expansion and contraction of the 6061T6 aluminum used for constructing the apparatus, coolant flow paths 90, see FIG. 2, are provided through the front 42 and rear 44 walls, and side walls 92 of the housing 34. Cooling of those walls also cools the liner plates 48. In this manner a consistent expansion and contraction of the apparatus is provided so that a consistent gap between the form rolls can be maintained without requiring adjustment for differences in expansion or contraction because of temperature differences.

While it is contemplated that cooling will be used when the confectionery product is a chocolate confection, other confectionery products may require heating instead of cooling. Accordingly, in such instances rather than flowing cooled water through the system, a heated fluid may be used instead.

The process and apparatus of the present invention in effect consists, especially when the confectionery product is chocolate, in submitting chocolate flakes or shavings and/or granules to sufficiently high compressive and shear stresses causing the individual particles to deform and fuse together. The process occurs in three distinct phases which correlate somewhat to the position of the material relative to the nip between the form rolls 18 and 20. As indicated in FIG. 1, the first phase indicated at 1, corresponds to a bulk compacting process. As the form rolls 18 and 20 counter-rotate the mass of particulate chocolate between the rolls is agitated so that the particles interact with one another imparting a general rotation to the particles within the bed of particles. In this phase the particles undergo weak forces which mainly tend to rearrange their location. The net effect is similar to shaking particles which result in a increase in the bulk material density of the material but no compression or material deformation.

The compaction phase ends when additional particle redistribution cannot result in a further reduction of bulk volume and a compression phase, indicated at 2, begins. Since the motion of the form rolls and the geometry requires a further reduction in volume this further reduction in volume is achieved by crushing and deforming the chocolate particles, mainly under high compressive forces applied by the surface of the form rolls. Thus, particle deformation proceeds, first by filling the available air pockets between particles and then causing the individual contiguous particles to fuse or sinter. This compaction phase results in mechanical energy transfer by way of heat so that the surface of the chocolate particles become heated into the temperature range where chocolate is in a more softened state. This surface warming of the chocolate particles also is beneficial in the fusing or sintering of the particles.

The force balance between the tangential frictional forces at the surface of the form rolls and the compressive force component parallel to the nip defines the feasibility condition for the sintering process. The compressive force depends on the particle size, mold cavity size and spacing, and form roll diameter. The frictional force depends on the shear rate at the surface and is a function of the form roll speed of rotation.

The compression phase begins just above where the smallest spacing between the form rolls exists, indicated at 3 in FIG. 1. Chocolate is a non-Newtonian fluid whose flow properties are dependent on time or duration of shear. In the compression phase 3 the chocolate deformation rates are high and the material behavior is essentially plastic akin to the behavior of a Bingham plastic fluid. Bingham plastic fluids are probably the simplest non-Newtonian fluids because in a graph of shear stress plotted against shear rate the relationship is linear with a positive offset corresponding to the characteristic yield value of the chocolate.

Thus, when the chocolate in the compression phase exceeds the yield stress the material behavior becomes elastic. The rate of strain is relatively independent of the applied force and the energy of deformation is dissipated as heat (i.e. the process is irreversible). Yield stress is a function of the chocolate composition and temperature. Thus, control of temperature by cooling of the form rolls permits repeatable consistency of product.

As noted above, due to the high compressive forces which result when shaping highly crystalline chocolate, the reactive forces imparted to the form rolls 18 and 20 and their respective shafts 30 and 32 are also quite high. This results in an outward flexing or bowing of the shafts 30 and 32.

The outward flexing of shafts 30 and 32, which also causes an outward movement of the form rolls 18 and 20 also have a beneficial aspect in assisting separation of the formed sheet from the form rolls below the nip.

It has also been found when processing chocolate, which behaves like a Bingham plastic, that due to the high resulting pressures the shafts 30 and 32, in addition to flexing, also twist as well. This results because there is a large change in the reactive force imparted to the form rolls and shafts during rotation depending on the rotation position with respect to pocket passage through the nip area. Thus as the form rolls are rotated they are subject to an increase in reactive force, a decrease and an increase. The net result is to impart an oscillating twisting force to the shafts as well which, along with the oscillating shaft flexing, is beneficial in initiating separation of the formed sheet of chocolate after the chocolate sheet has passed between the nip of the rolls.

To attain the desired shaft flexure and twisting effect it is important to maintain a dimensional relationship between the diameter of shafts 30 and 32 and the diameter and width of form rolls 18 and 20. The mechanical properties of the shafts are also a critical factor in determining the level of flexure and twist effect. The magnitude of these effects can be determined through mechanical analysis of the system, the operating conditions, and the physical properties of the material being formed. Measurement of formed material attributes indicates that the magnitude of this flexure is 0.1 mm in both the separation and twist orientation.

If the diameter of the shafts 30 and 32 is large in comparison to the diameter of the form rolls shaft flexing and twisting would not take place to the degree necessary to obtain the desired movement to insure that the sheet of formed material comes off the rolls without degradation in the integrity of the product shape.

It has been found that good sheet separation may be obtained with a form roll outer diameter of about 28 cm and a width of about 14.8 cm with a shaft diameter of about 6.5 cm when the shafts are 316 stainless steel.

As noted the diameter of the form roll is also dictated by the overall size of the piece to be formed to insure repeatable disengagement of the sheet from the form roll without degradation of the product shape. It has been found that with form rolls having an outer diameter of about 28 cm to form a lentil shape as used for the size of an M&M's® candy a depression having an overall diameter of about 12.19 mm and a maximum depth of about 2.74 mm may be effectively employed.

The apparatus and process of the present invention achieves significant cost benefits over the traditional melt processing system employed heretofore. Current production equipment used to melt process chocolate to form lentils as used in M&M's® candies use form rolls having a diameter of about 40 cm and width of about 80 cm. These rolls contain over 6,500 pockets. This process must crystallize and cool the chocolate from its liquid depositing temperature near 30° C. to it discharge temperature near 15° C. Also these form rolls must rotate at the relatively slow speed of 5 rpm. Under these conditions throughput of finished chocolate pieces is about 1200 kg/hr.

With the apparatus of the present invention form rolls of about 28 cm in diameter and about 15 cm wide can operate at a speed of over 100 rpm and produce a throughput of 1500 kg/hr of finished pieces. In addition, cooling using only 10–20° C. chilled water is necessary rather than use of an antifreeze solution such as an ethylene glycol solution at about –20° C. Also, post forming cooling tunnels are not necessary so that a significant cost factor for this equipment and its refrigeration system is completely eliminated. Decoupling of the crystallization and forming process in the present invention allows for the independent optimization of both functions yielding a more overall optimized process.

It is thus seen that the present invention achieves significant cost saving in equipment and power requirements while achieving significant increase in throughput with equipment which occupies less space.

What is claimed is:

1. A process for cold forming shaped articles of an edible product comprising:

feeding material having a Bingham plastic rheology from which the articles are to be shaped in free flowable particulate form to a pair of counter rotating form rolls which have indentations on their surfaces conforming to the desired shape of said articles;

compacting and compressing said particulate material to form a unified cohesive sheet of said material including shaped articles which conform to said indentations interconnected by a thin web of said material; and separating the shaped formed articles from the interconnecting web.

2. The process of claim 1, wherein the material is a fat continuous material.

3. The process of claim 1, wherein the material is gravity fed to said form rolls.

4. The process of claim 1, including the step of cooling the surfaces of said form rolls to remove heat from said articles generated by said compaction and compression.

5. The process of claim 4, including circulating a cooling medium near the surfaces of said form rolls and circulating a cooling medium through shafts upon which said form rolls are mounted.

6. The process of claim 1, including the step of generating differential motion between said form rolls to enhance the release of the unified cohesive sheet from said rolls.

7. The process of claim 1, including the step of imparting a differential flexing movement to shafts on which said form rolls are mounted as said material passes through the nip of said form rolls.

8. The process of claim 1, including the step of imparting a twisting force to shafts on which said form rolls are mounted as said material passes through the nip of said form rolls.

9. The process of claim 1, including the step of imparting a differential flexing movement and a differential twisting force to shafts on which said form rolls are mounted as said material passes through the nip of said form rolls.

10. The process of claim 2, wherein said fat continuous material is chocolate.

11. The process of claim 3, wherein said material is chocolate.

12. The process of claim 4, wherein said material is chocolate.

13. The process of claim 5, wherein said material is chocolate.

14. The process of claim 6, wherein said material is chocolate.

15. The process of claim 7, wherein said material is chocolate.

16. The process of claim 8, wherein said material is chocolate.

17. The process of claim 9, wherein said material is chocolate.

* * * * *

UNITED STATES PATENT AND TRADEMARK OFFICE
CERTIFICATE OF CORRECTION

PATENT NO. : 6,270,826 B1
DATED : August 7, 2001
INVENTOR(S) : Peter Thomas Kashulines, Jr. et al.

It is certified that error appears in the above-identified patent and that said Letters Patent is hereby corrected as shown below:

Column 1,
Line 47, "non melted" should read -- non-melted --; and
Line 64, "counter rotating" should read -- counter-rotating --.

Column 2,
Line 66, "super cooled" should read -- super-cooled --.

Column 3,
Line 44, "DRAWING" should read -- DRAWINGS --.

Column 8,
Line 27, "it" should read -- its --.

Signed and Sealed this

Seventh Day of February, 2006

JON W. DUDAS
*Director of the United States Patent and Trademark Office*